March 10, 1970    C. A. NAPOR ET AL    3,499,202
FILM CARTRIDGE LOADING MACHINE

Filed Oct. 10, 1967    12 Sheets-Sheet 1

INVENTORS
CARL A. NAPOR
WILLIAM T. ENGEL
CHARLES G. KRUMM
BY
                          ATTORNEY

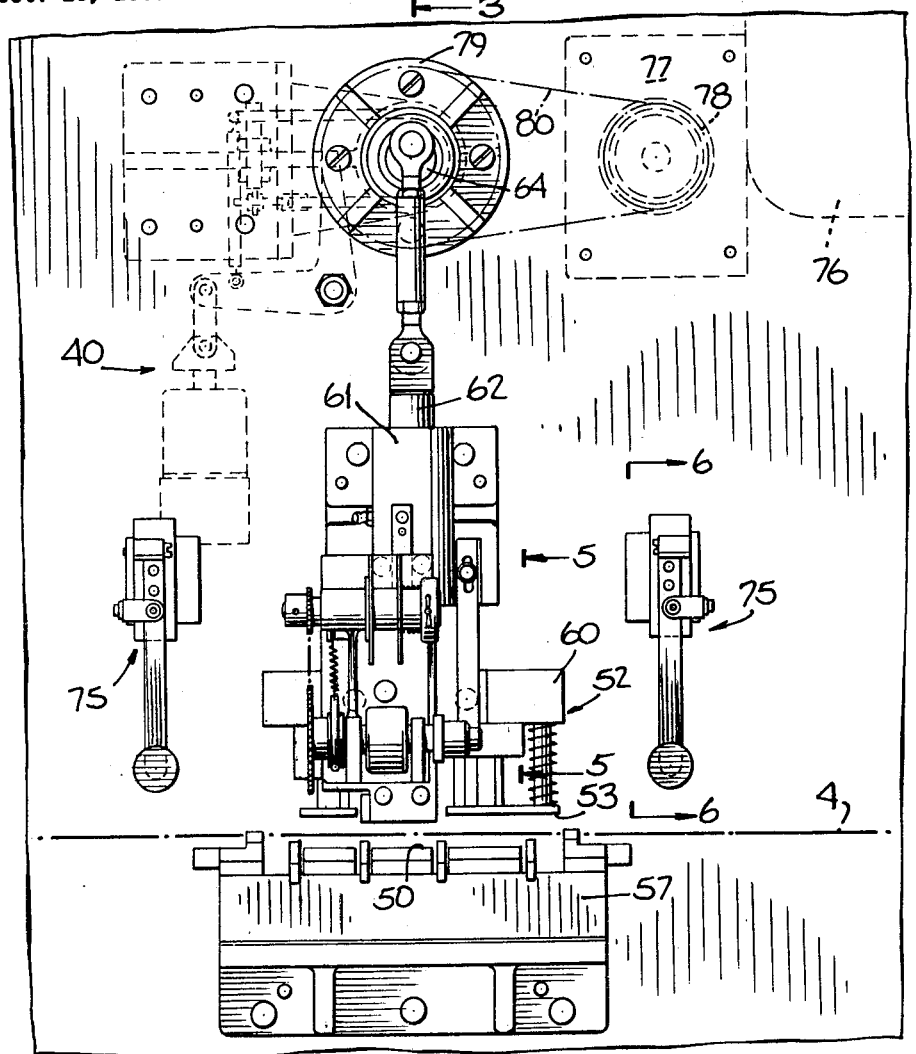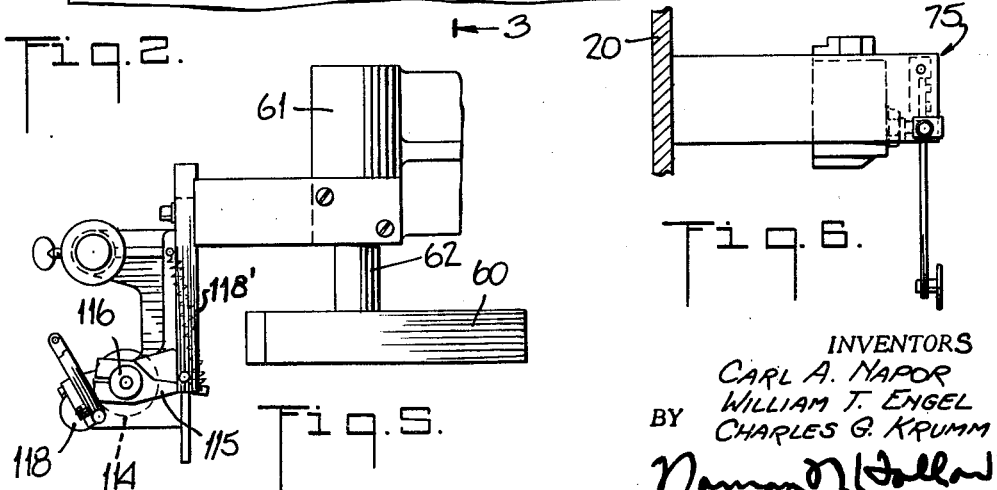

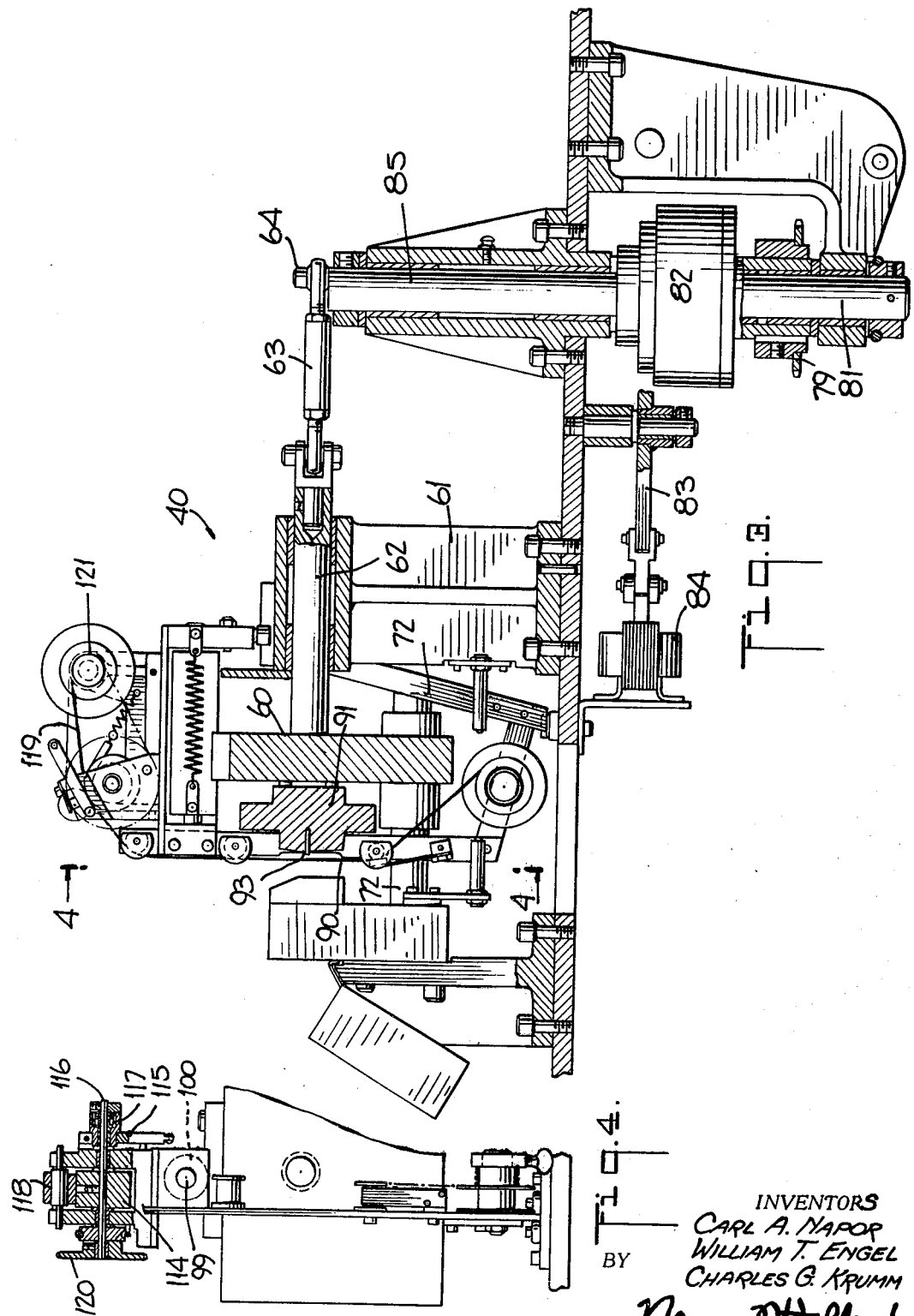

March 10, 1970 C. A. NAPOR ET AL 3,499,202
FILM CARTRIDGE LOADING MACHINE
Filed Oct. 10, 1967 12 Sheets-Sheet 4

INVENTORS
CARL A. NAPOR
WILLIAM T. ENGEL
CHARLES G. KRUMM
BY
Norman M Hallow
ATTORNEY

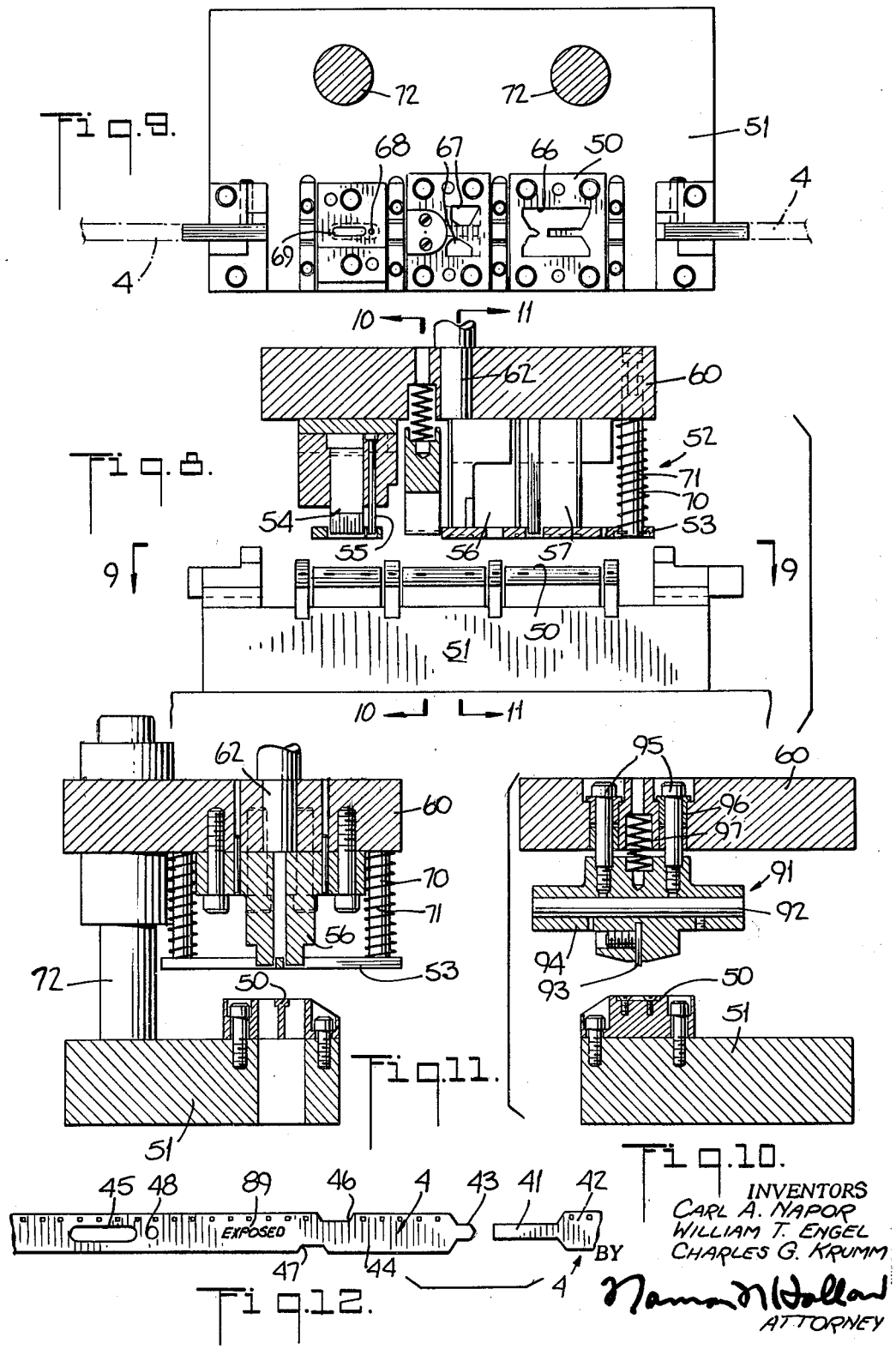

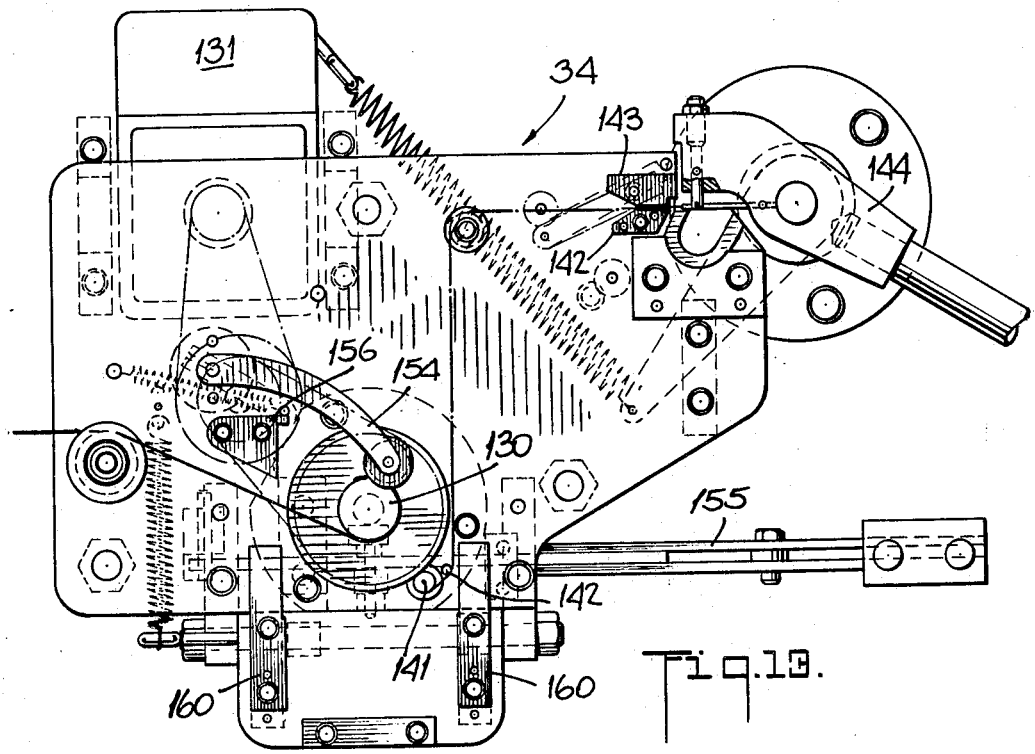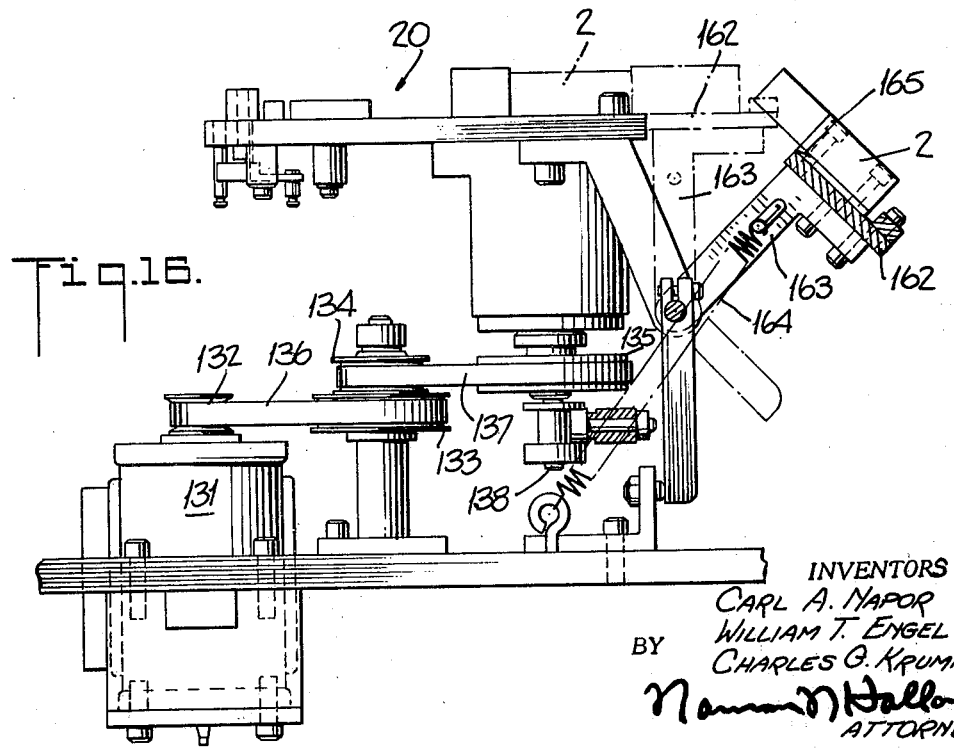

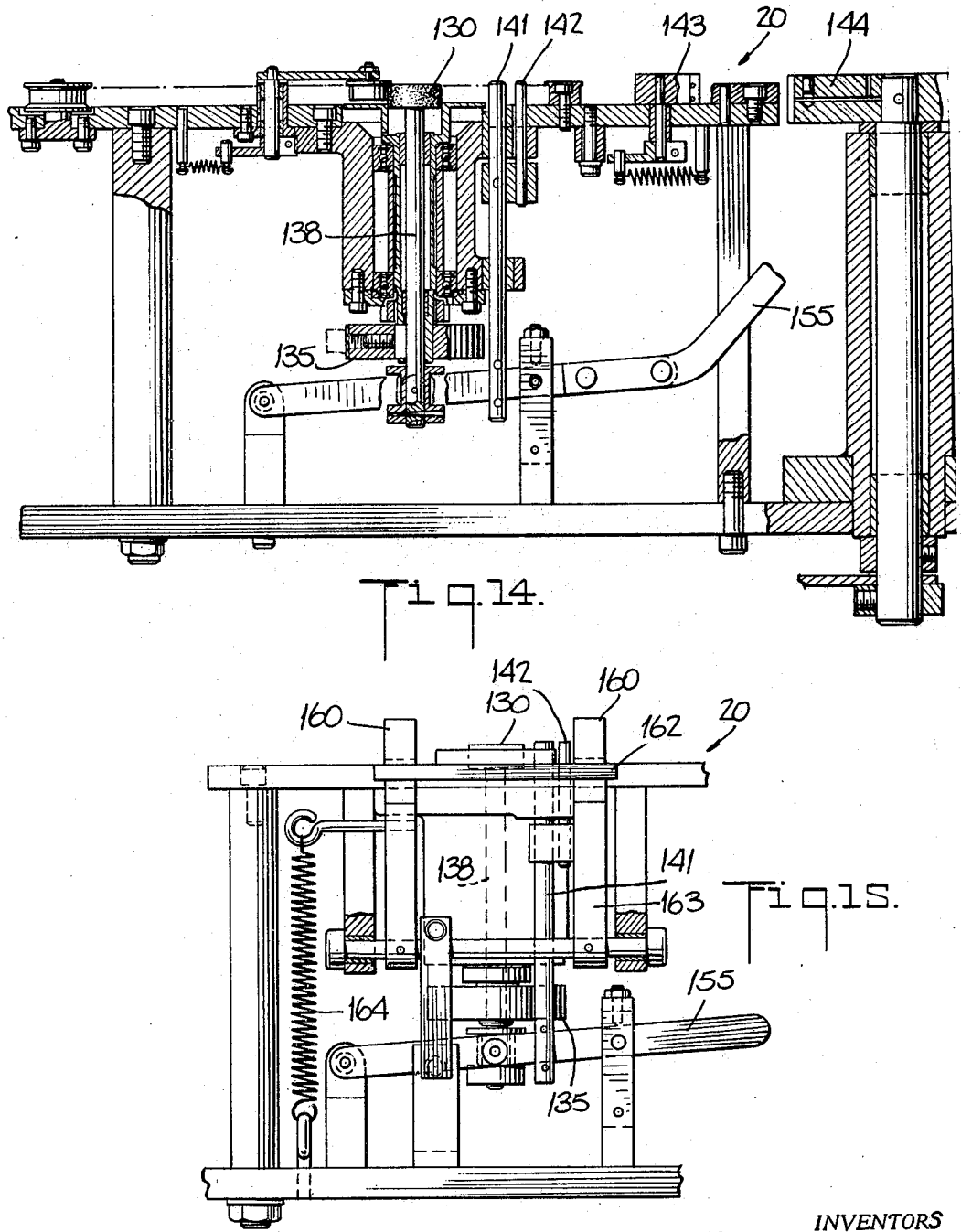

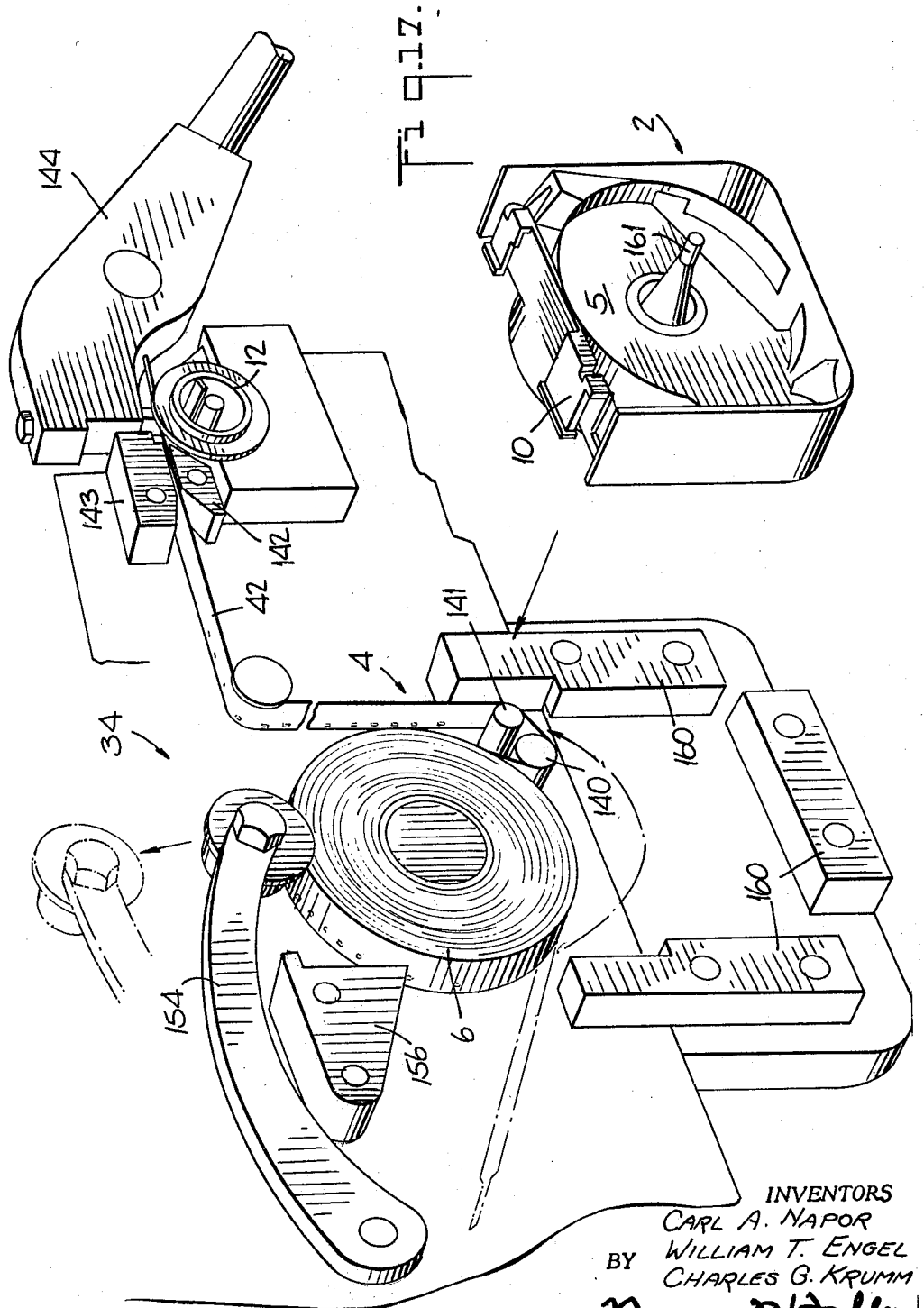

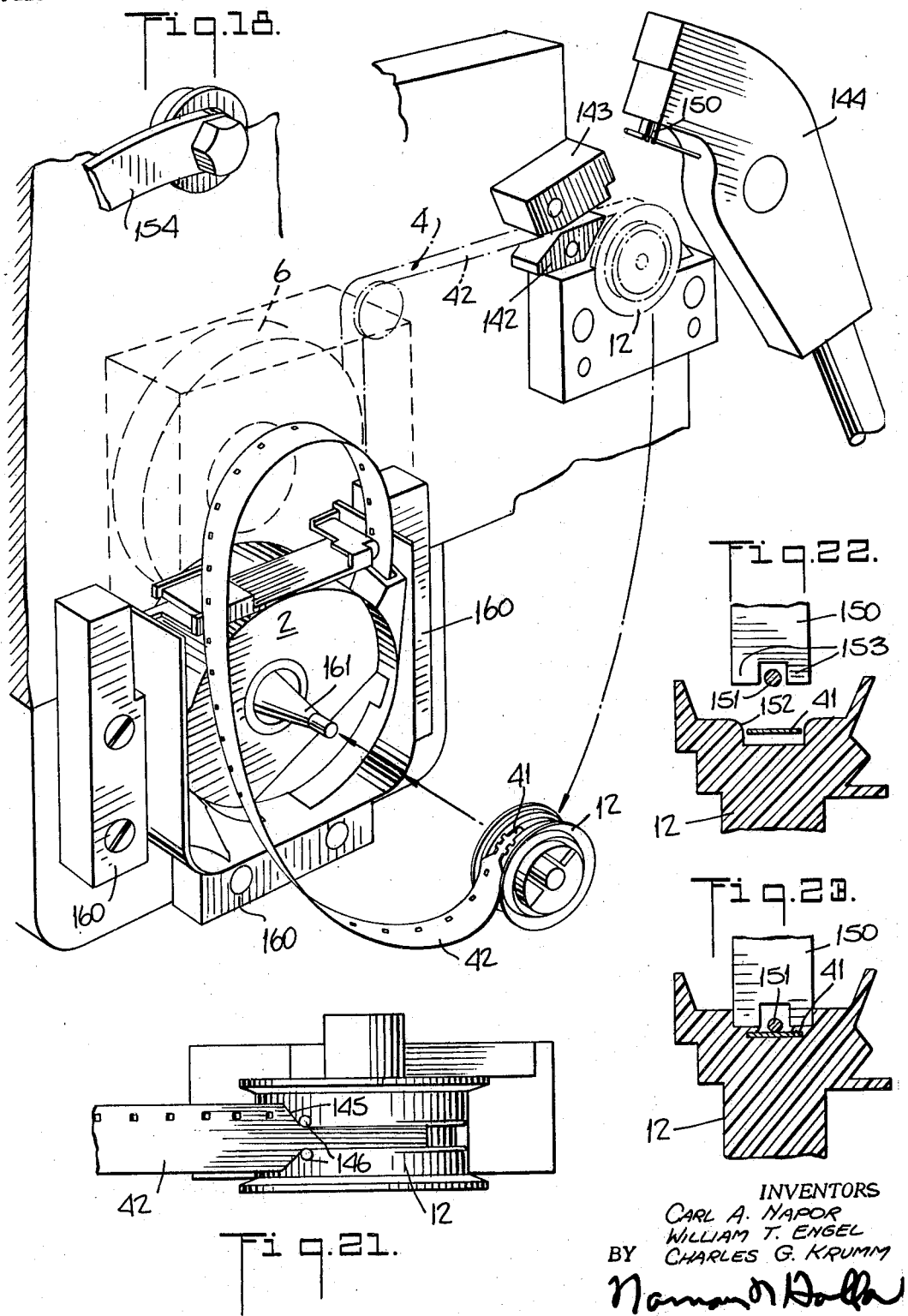

March 10, 1970  C. A. NAPOR ET AL  3,499,202
FILM CARTRIDGE LOADING MACHINE
Filed Oct. 10, 1967  12 Sheets-Sheet 10

INVENTORS
CARL A. NAPOR
WILLIAM T. ENGEL
CHARLES G. KRUMM
BY
ATTORNEY

March 10, 1970 C. A. NAPOR ET AL 3,499,202
FILM CARTRIDGE LOADING MACHINE
Filed Oct. 10, 1967 12 Sheets-Sheet 11
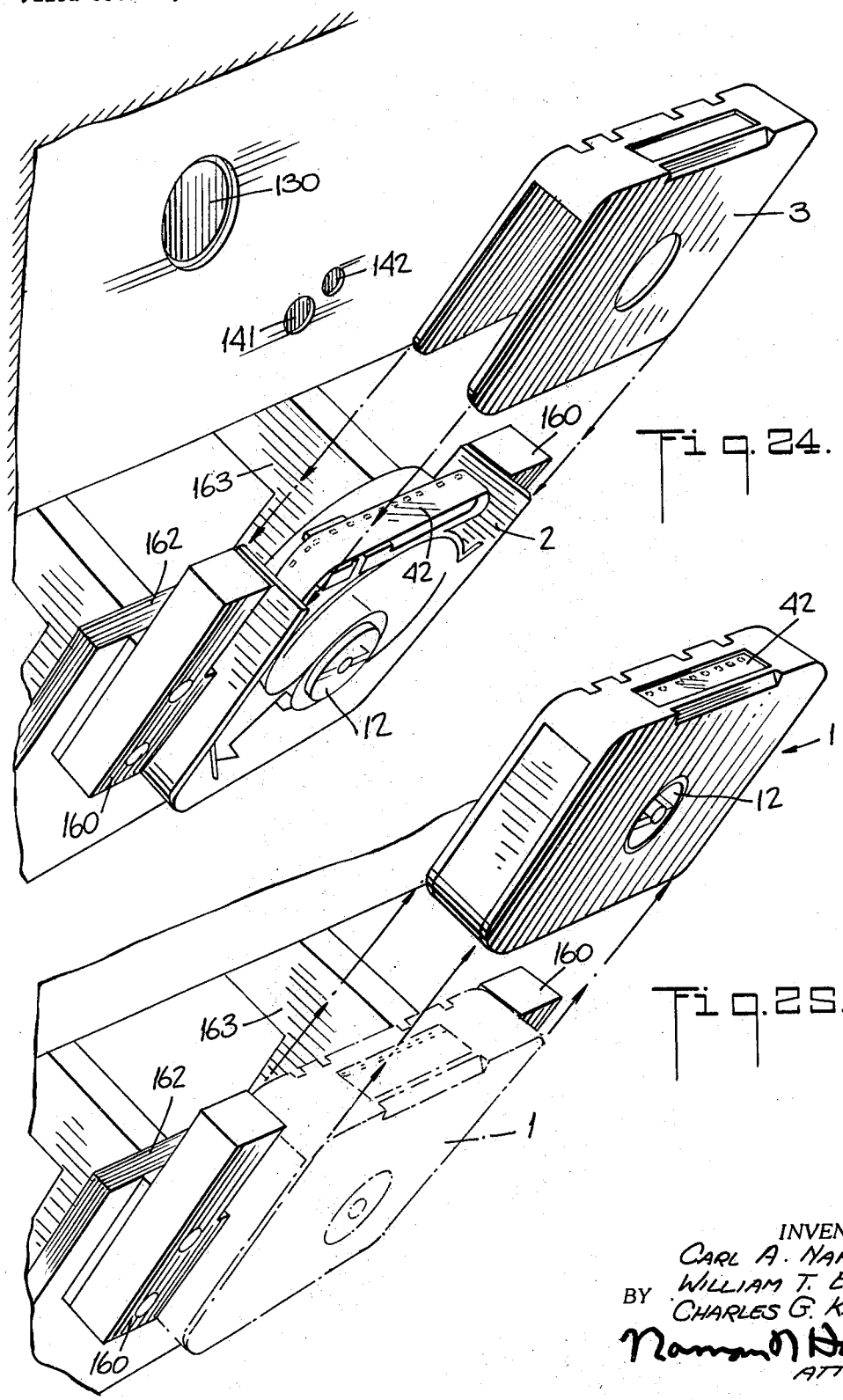
INVENTORS
CARL A. NAPOR
WILLIAM T. ENGEL
BY CHARLES G. KRUMM
ATTORNEY

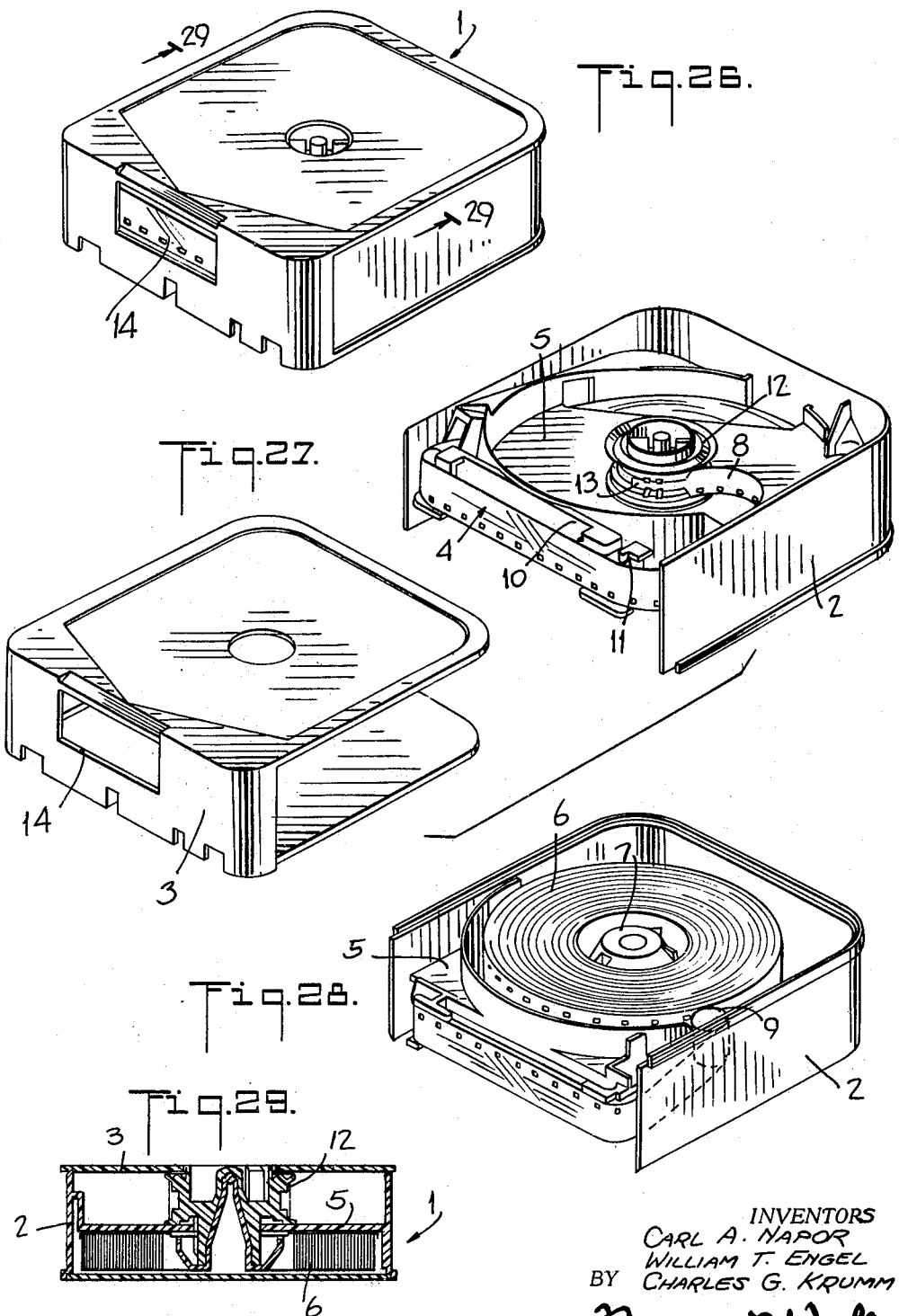

United States Patent Office 3,499,202
Patented Mar. 10, 1970

3,499,202
FILM CARTRIDGE LOADING MACHINE
Carl A. Napor, Glen Ridge, William T. Engel, Union, and Charles G. Krumm, Wyckoff, N.J., assignors to Kahle Engineering Company, Union City, N.J., a corporation of New Jersey
Filed Oct. 10, 1967, Ser. No. 674,151
Int. Cl. B23p 11/10; B65d 57/20, 63/04
U.S. Cl. 29—200                     11 Claims

ABSTRACT OF THE DISCLOSURE

A machine for loading film into film cartridges such as motion picture camera cartridges and particularly cartridges having a film take-up roller positioned on the opposite side of a cartridge center partition from a rolled film supply. The machine includes a film supply roll holding an indeterminate length of film and a driven film winding roller spaced from the supply roll. A film footage counter and a film punch are positioned between the supply roll and the film winding roller for controlling the length of the roll and for cutting and matching the leading and trailing ends of the wound film. Adjacent the film winding roller a staking tool is mounted for attaching the leading end of the rolled film to the cartridge take-up spool. A cartridge loading mechanism is provided which withdraws the film winding roller from the wound film roll and which also positions the cartridge to facilitate the mounting of the rolled film on one side of the cartridge center partition and the attached cartridge film take-up spool on the opposite side of the cartridge center partition with the film lead threaded along a curved guide path in the magazine. The loading mechanism includes a movable support to move the loaded cartridge body to an inclined position to permit the cartridge cover to be slipped over the cartridge body.

BACKGROUND OF THE INVENTION

A film cartridge has recently been developed for motion picture cameras in which a compact arrangement for the film is obtained by mounting a film supply roll and a film take-up spool in co-axial side-by-side relationship on opposite sides of a cartridge central partition. In the assembly of the cartridge, the film is threaded around a sharply curved path past an exposure aperture from the supply roll to the co-axial take-up spool.

While this magazine is particularly desirable due to its compact form, a problem is presented in loading film into the cartridge due to the side-by-side relationship of the film roll and the take-up spool on opposite sides of the cartridge partition. In loading such a cartridge, for example, it is necessary to first form a feed roll of film of the appropriate length with a film lead portion. Thereafter, a take-up spool must be attached to this lead and the film must be fed past a cartridge exposure aperture along a sharply curved guide path which will guide the film from one side of the cartridge to the other. The machine of the invention provides a semi-automatic arrangement for facilitating this cartridge loading operation and permits the entire cartridge loading step to be performed by a machine operator with only a few simple hand operations. A machine is thus provided for rapidly and accurately loading motion picture film cartridges with a minimum of personnel and in an easily performed semi-automatic loading operation.

The machine includes a film winding roller and a related control for winding a roll of film of predetermined length as well as a punch for cutting and shaping film ends and a film attaching tool and a magazine loading and closing device which permits the operator to complete the insertion and threading of the film within the magazine in a few simple semi-automatic steps.

Accordingly, an object of the present invention is to provide an improved machine for loading film cartridges.

Another object of the present invention is to provide an improved machine for loading motion picture cartridges having supply and take-up spools co-axially mounted on opposite sides of a cartridge center partition.

Another object of the present invention is to provide a high capacity semi-automatic motion picture cartridge loading machine.

Another object of the present invention is to provide an improved means for attaching a motion picture film to a take-up roll for a film cartridge.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

BRIEF DESCRIPTION OF THE DRAWING

FIG. 2 is an enlarged fragmentary top plan view of the machine illustrating film punch assembly;

FIG. 3 is a vertical sectional view of the punch assembly taken along line 3—3 on FIG. 2;

FIG. 4 is a vertical sectional view of the printing mechanism taken along line 4—4 on FIG. 3;

FIGS. 5 and 6 are vertical sectional views of the punch assembly taken along lines 5—5 and 6—6, respectively, on FIG. 2;

FIG. 8 is a horizontal sectional view of the punch and die portions of the punch assembly;

FIG. 9 is a vertical sectional view of the punch assembly taken along line 9—9 on FIG. 8;

FIGS. 10 and 11 are vertical sectional views of the printing die and the punch assembly taken along lines 10—10 and 11—11, respectively, on FIG. 8;

FIG. 12 is an enlarged detailed view illustrating a film strip after being punched to form the tail end of one strip and the leading end of another strip;

FIG. 13 is an enlarged detailed top plan view of the spooling assembly;

FIGS. 14, 15 and 16 are vertical sectional views of the spooling assembly of FIG. 13;

FIGS. 17 and 18 are perspective views of the spooling assembly illustrating successive steps in inserting the rolled film into the film cartridge;

FIG. 21 is an enlarged detailed side elevational view of a cartridge take-up spool with the film strip staked to it;

FIGS. 22 and 23 are enlarged sectional views of a take-up spool illustrating the film staking operation;

FIGS. 24 and 25 are perspective views of the cover fitting portion of the spooling assembly illustrating successive steps in fitting the cartridge cover over the cartridge body;

FIG. 26 is a perspective view of a completely loaded and assembled cartridge;

FIG. 27 is an exploded perspective view illustrating the cartridge loaded with film;

FIG. 28 is a perspective view illustrating a loaded cartridge body viewing the opposite side from that illustrated in FIG. 27; and FIG. 29 is a vertical sectional view of a loaded and assembled cartridge taken along line 29—29 on FIG. 26.

DESCRIPTION OF THE PREFERRED EMBODIMENT

Figure 1:
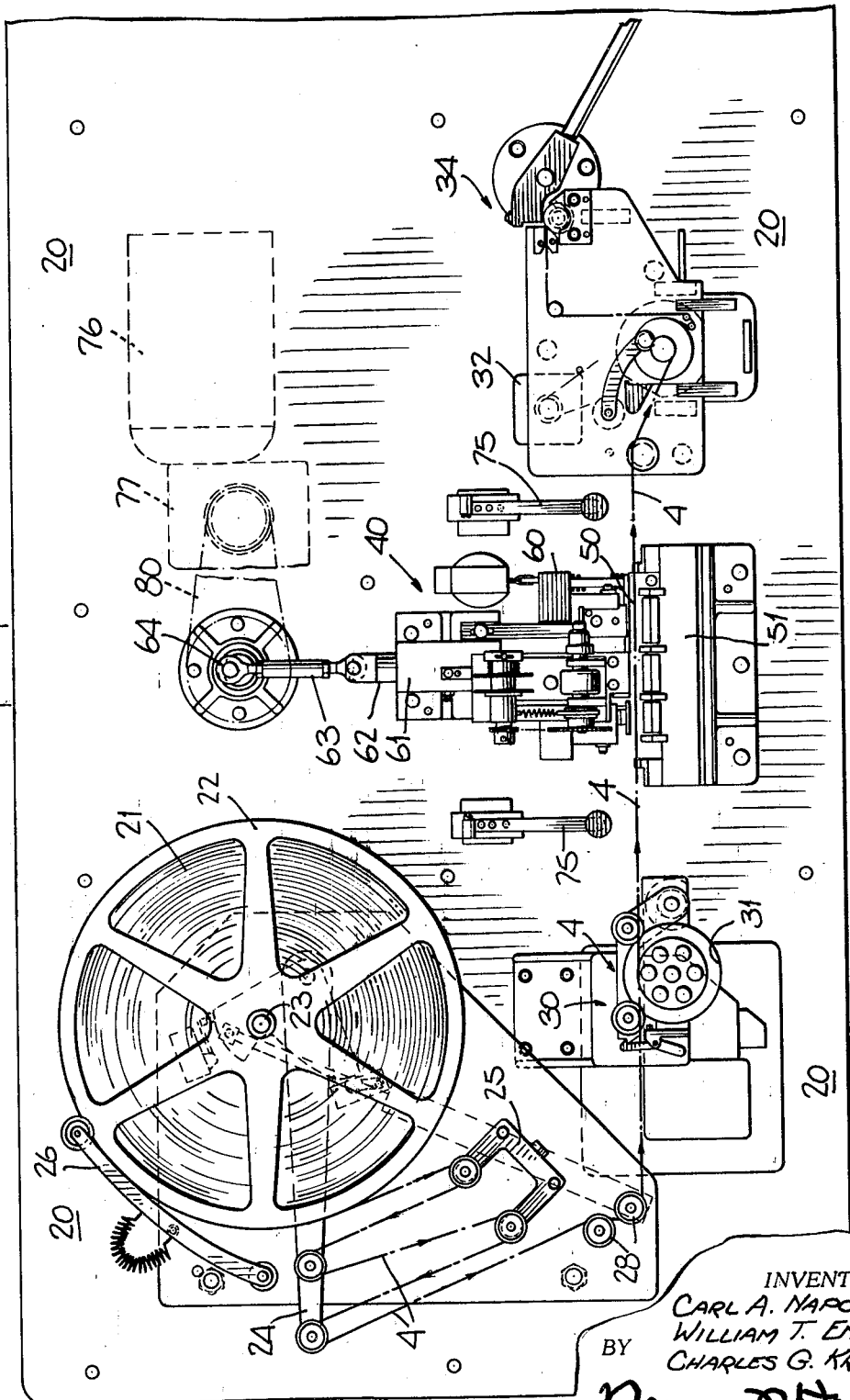
FIG. 1 is a top plan view of a preferred embodiment of the film cartridge loading machine.
Figure 7:
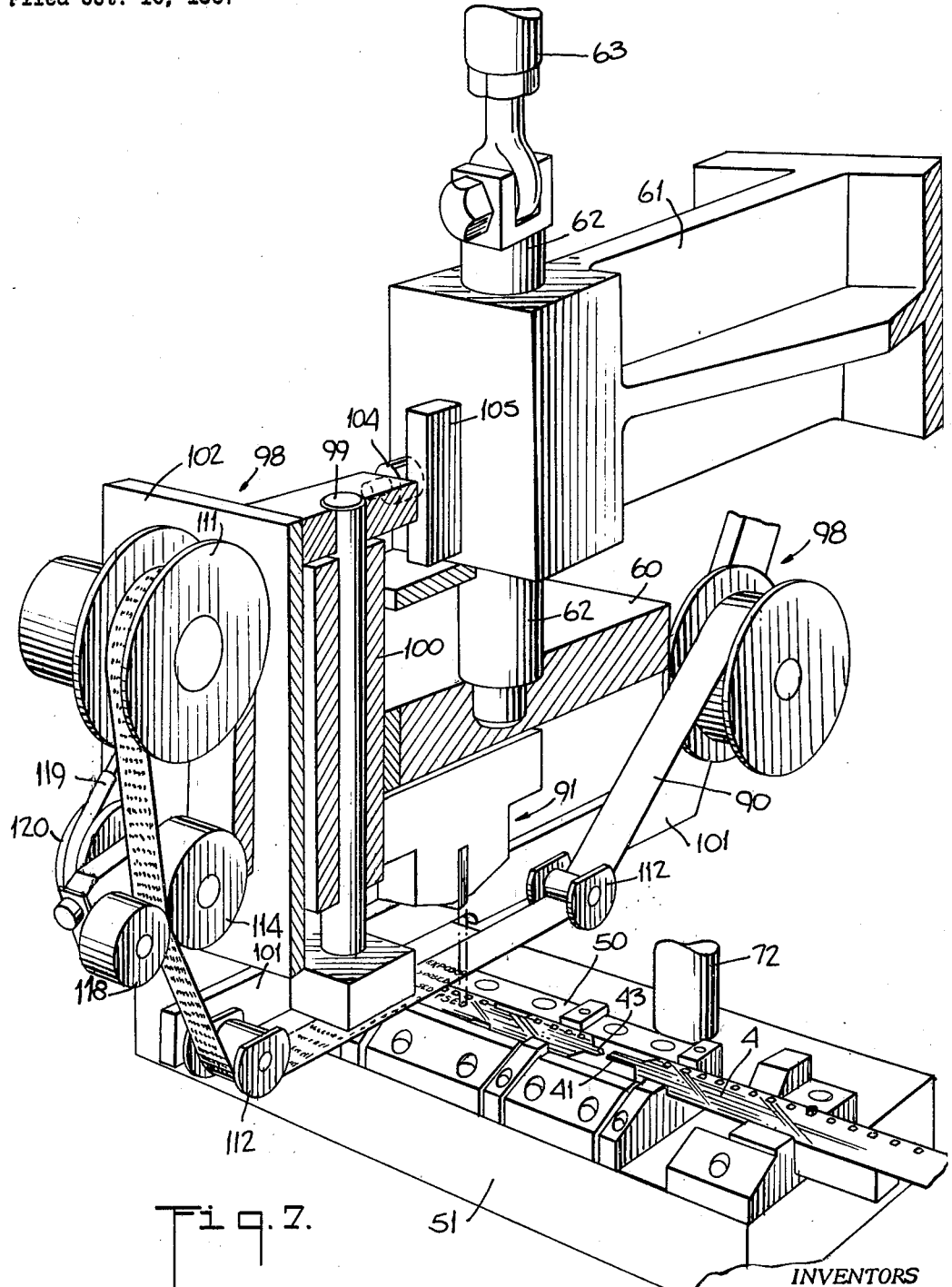
FIG. 7 is a perspective view partially cut away of the film punch assembly.
Figure 19:
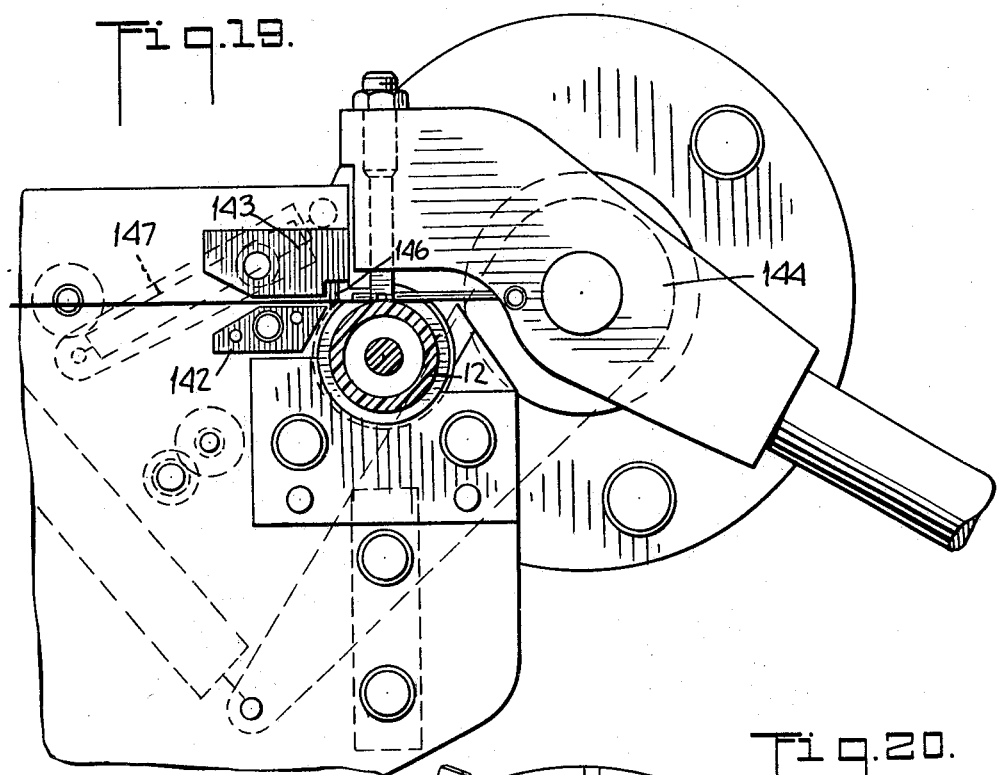
FIGS. 19 and 20 are enlarged detailed plan views of the staking means at the spooling assembly for attaching the film lead to the cartridge take-up spool.

The cartridge loading machine will first be described generally with particular reference to FIG. 1 which is a plan view of the machine and FIGS. 27 through 29 which illustrate a typical cartridge of the type which is loaded by the machine of FIG. 1.

Referring first to FIGS. 27 through 29, a motion picture film cartridge 1 is illustrated which comprises a molded body portion 2 and a cover 3 for forming the closed cartridge 1 after the body portion 2 is loaded with the film 4. A compact cartridge is obtained by the design illustrated which is characterized by the body portion 2 of the cartridge 1 having a central partition 5. As seen in FIG. 28, the unexposed roll 6 of film 4 is positioned on one side of the partition 5 surrounding a stationary conical boss 7 and the free end or the lead 8 from this film roll 6 is fed around a snubber 9 across a pressure pad 10 to the other side of the partition 5 as illustrated in FIG. 27. The film lead 8 which is fed into the other side of the body portion 2 passes around a smooth edge 11 of the pressure pad 10 and thence to a rotatably mounted film take-up spool 12 to which the free end 13 of the film lead 8 is attached in a manner which will be further described below. When the film is thus loaded into the cartridge body 2, the cartridge cover 3 is slipped over the cartridge body 2 to form the closed cartridge 1 as illustrated in FIG. 26 and which includes an exposure aperture 14 across which the film 4 passes as the film 4 is wound from the film roll 6 illustrated in FIG. 28 onto the take-up spool 12 as illustrated in FIG. 27 as the film is exposed in a camera.

The above description of the cartridge 1 is provided to facilitate an explanation of the loading machine of the present invention and to demonstrate the reason for the several successive steps as performed semi-automatically in the machine in accordance with the invention. The cartridge itself forms no part of the present invention and may be of the type described, for example, in U.S. Patent No. 3,208,686.

A general description of the operation of the cartridge loading machine to load a cartridge of the type of cartridge 1 described above will now be given with particular reference to FIG. 1. The machine is illustrated at 20 in FIG. 1 without a protective cover for loading photosensitized film. The machine 20 in actual operation will be run in a darkened room or with its unexposed film supply otherwise protected from exposure.

A large supply roll 21 of sensitized and unexposed motion picture film 4 is mounted on a suitable reel 22 supported on a rotating hub 23 at the left hand side of the machine. The film 4 from the supply roll 21 is directed through a film storage reservoir including a pivotally mounted and spring loaded dancer arm 24 and a pulley bracket 25 to insure a smooth continuous passage of the film from the supply roll 21. The supply roll 21 is preferably engaged with a pivotally mounted pressure arm 26 and the hub 23 for the reel 22 is preferably coupled to a suitable mechanical or electrical clamping brake means to provide an appropriate drag for the rotating supply reel 22.

The film 4 is led out of the reservoir through suitable guide rollers 28 to a film footage counter 30. The counter 30 may be of the rotating drum type in which a central sprocket wheel 31 is provided to engage the film sprocket holes. The wheel 31 preferably has a predetermined circumference such as one foot and the counter is set to count a predetermined number of full turns to provide a film roll of predetermined length. When the counter reaches the preset count it may operate an indicator or a switch to turn off the spooling drive motor 32. Such film counters are commercially available including a sprocket wheel and an adjustable counter which is preset to activate one switch as, for example, the motor turn-off switch at the 51st turn and to activate a second switch on a subsequent turn, such as the 52nd turn to apply a brake to the counter. The spooling drive motor 32 is located at the right hand side of the machine 20 and will be further described below in the description of the cartridge spooling and loading assembly 34.

THE FILM PUNCHING ASSEMBLY

Each of the lengths of films which is loaded into a cartridge 1 is shaped at its leading and trailing ends to facilitate its loading in the cartridge 1 and also to provide indices to facilitate processing. A punching assembly 40 is positioned between the counter 30 and the spooling assembly 34 which simultaneously punches the leading end of the rolled film strip and the trailing end of the next film strip to be rolled. FIG. 12 illustrates these punched sections of the film 4. The right-hand side of the illustrated sections of film 4 is shown with a staking tongue 41 punched in its leading end 42. This tongue 41, as will be more fully described below, is used to attach the leading end 42 of the film strip to a film take-up spool 12 for a cartridge 1.

The left-hand portion of the film in FIG. 12 illustrates a threading tongue 43 to facilitate the wrapping of the trailing end 44 of the film strip around the film rolling boss 7 which has a relatively soft resilient coating such as urethane which facilitates the film on boss 7 grip without slots or clamps. This tongue 43 fits within a spaced slot 45 to provide a smooth attachment and winding action for the turns of the rolled film 6. Other punched portions used for indexing or processing information are illustrated as the typical side notches 46 and 47 and a perforation 48.

The punching assembly 40 illustrated generally in FIG. 1 and illustrated in detail in FIGS. 2–11 includes a punching die 50 which is mounted on a die plate 51. The punch 52 includes a pressure plate 53 and a variety of appropriately shaped punches 54, 55, 56 and 57 (FIG. 8) and a punch mounting plate 60 movably mounted on a support 61. The punch drive means which will be further described below includes a sliding support rod 62 coupled by an adjustable threaded connecting rod 63 to a drive crank 64.

The complementary die 50 and punch members 54–57 are illustrated in detail in FIGS. 8–11. Thus, the shaped die 50 mounted on the die plate 51 includes a first cutting section 66 to form the tongues 41 and 43 (FIG. 12) described above, additional sections 67 to form the processing notches 45 and 46 and a circular perforation 68 and a slotted perforation 69 to form perforation 48 and the slot 45. The related punches 54–57 are mounted on the punch mounting plate 60 and they include the tongue punch 57, the processing notch punch 56, perforating punch 55 and the slot punch 54. The punch pressure plate 53 having suitable apertures surrounding the above described punches is conveniently mounted on support rods 70 to releasably engage the film strip during the punching operation under the force of compressed coil springs 71. The punch mounting plate 60 is slidably mounted on guide rods 72 (FIGS. 9 and 11).

At the termination of a cartridge spooling and loading operation in the above described manner, the stationary film 4 is punched at the punching assembly 40 when the operator simultaneously closes the two spaced safety switches 75. Switches 75 are coupled in series in the control circuit for the punch drive so that the two switches 75 must both be closed requiring the operator to keep both hands on the switches 75 during the punching operation. A preferred punch drive is best illustrated in FIGS. 2 and 3. The drive includes a continuously running drive motor 76 coupled through a suitable gear reduction 77, drive sprockets 78 and 79, connecting chain 80 and drive shaft 81 to a one revolution drive clutch 82. The clutch 82 preferably is of the type in which by the activation of the mechanical clutch lever 83 causes the clutch 82 to turn one complete revolution and thereafter open. These clutches including the cooperating control lever 83 are commercially available. In the preferred embodiment, the clutch 82 is activated for operation by a drive solenoid 84 moving control lever 83. The solenoid 84 is coupled in series through the above described control switches 75 to a power source for operation on the simultaneous closing of the two switches 75 by the operator. The output shaft 85 of the one revolution clutch 82 is coupled to the punch support rod 62 by crank 64 and connecting rod 63.

For the convenience of the cartridge user and the processor, it is preferred to have an indication when the film has been exposed. A preferred means for providing this indication is to print an indication directly on the film such as the word "exposed" 89 (FIG. 12) so that this word will appear at the cartridge 1 aperture 14 (FIG. 26) when the film 4 is run to its fully exposed position in the cartridge 1. A preferred printing means for applying this indication to the film strip 4 comprises a printing tape 90 which is a tape of indeterminate length having a heat sensitive coating which is transferred to the film by pressing an appropriately lettered heated printing head 91 against the tape 90 and the film 4.

FIGS. 3, 4, 7 and 10 illustrate a preferred embodiment of the tape printing means as mounted on the punch mounting plate 60. The printing means includes the printing head 91 including an electric heating element 92 (FIG. 10) and a printing bar 93. As best seen in FIG. 10, the printing head 91 includes a support member 94 for the printing bar 93 which is resiliently mounted on the plate 60 by means of spaced support bolts 95 slidably coupled to the plate 60 in bearings 96. The printing head 91 is yieldably urged toward the film 4 during the printing operation by coil spring 97. The tape 90 is mounted on a frame 98 which is slidably supported on the punch mounting plate 60.

The frame 98 mounting comprises a mounting rod 99 slidably supported in a bearing block 100 which is attached to and which moves with the punch plate 60. The mounting frame 98 for the tape including support arm 101 and end plate 102 thus is moved towards the tape 90 by the punch plate 60 during the punching action to place the tape 90 across the film 4 in position for the printing head to engage and heat it and to transfer the legend exposed to the film. As illustrated in FIG. 3, the tape 90 printing head 91 is resiliently urged towards the tape 90 by the coil spring 97. This provides for a yielding engagement between the tape 90 and the film 4 when the punch plate 60 together with the tape support frame 98 have been moved to their punching and printing positions. A guide roller 104 on the support frame 98 rides on a vertical cam 105 attached to the punch support 61 to direct the moving tape support frame 98 in its proper direction generally transversely of the film 4.

The tape 90 itself is supported between a rotatably mounted supply roller 110 at one end of the support frame 98 and a driven take-up roller 111 at the opposite end with spaced guide rollers 112 positioned along the bottom of the frame 98 to guide the intermediate run of the tape 90.

A drive means for advancing the tape 90 to present a new legend each time that the punch operates is best illustrated in FIGS. 3–5 and 7. As already indicated, a relative movement is provided between the tape 90 support frame 98 and the punch mounting plate 60 as they are moved into engagement with the punch die 50. This relative motion is used to advance the tape through the intermediation of the tape drive roller 114 which is turned by a drive arm 115 (FIG. 5) coupled to the roller support shaft 116 through a one-direction clutch 117 (FIG. 4). The tape support frame 98 movement is arrested prior to the completion of the forward punch motion resulting in a relative forward movement of the drive rod 118' (FIG. 5) fixedly mounted on the punch support 61. This permits the drive rod 118' to engage and turn the spring loaded drive arm 115 in a clock-wse direction through the intermediation of the clutch 117 which is adjustably set to advance the tape 90 to its correct new printing position during the subsequent backward movement of the punch. A pinch roller 118 is mounted adjacent to the tape drive roller 114 to engage the tape 90 and the tape 90 take-up roller 111 is preferably driven by drive roller 114 through the intermediation of the coupling belt 119 and pulleys 120 and 121.

THE CARTRIDGE SPOOLING AND LOADING ASSEMBLY

The spooling and loading assembly is illustrated generally at 34 in FIG. 1 and is illustrated in greater detail in FIGS. 13–25. The film 4 is initially formed into a roll 6 of the desired size on the driven winding arbor 130. The trailing end of the film 44 (FIG. 12) which has previously been cut and notched at the notching assembly described above, is wrapped around the arbor 130 by the operator. The winding is then commenced as the operator energizes the winding motor 131 which, as illustrated in FIGS. 13–16, is coupled to the arbor 130 through the intermediation of drive pulleys 132–135, belts 136 and 137, and the vertical arbor support shaft 138 (FIG. 14). As already indicated, the winding motor is preferably under control of counter 30 which turns it off when the proper number of turns have been made on the arbor 130 and as preset in the counter 30.

The punching assembly 40 is now operated with the result that a film lead including staking tongue 41 is formed in the portion of the film 4 extending to the punching assembly 40. In the next operation, the staking tongue 41 is attached to the small take-up spool 12 for subsequent mounting within the cartridge 1.

Figure 20:
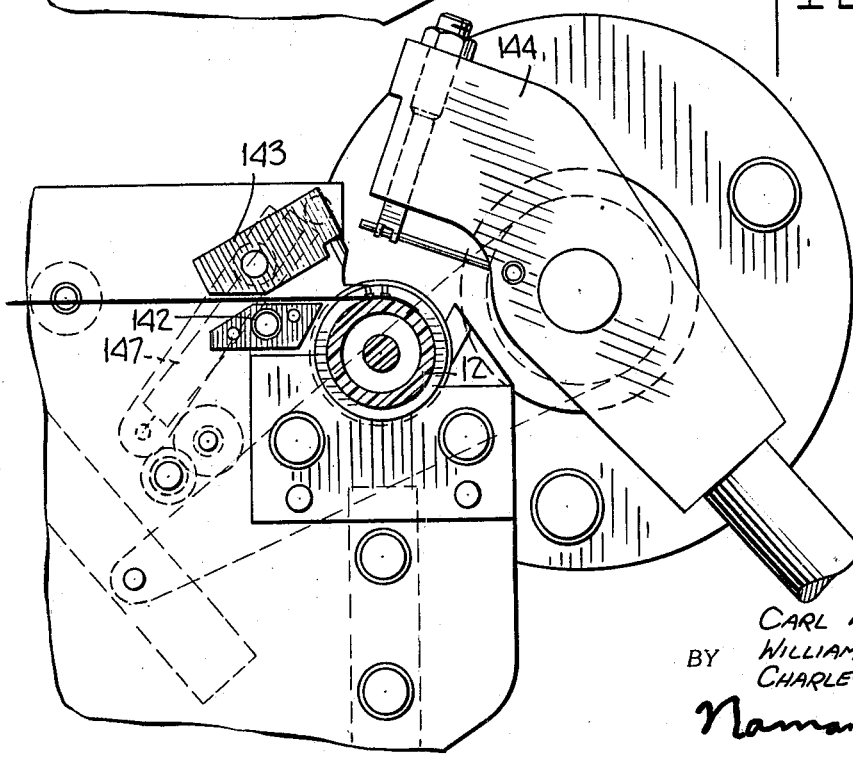

In the staking operation, the machine operator first threads the leading end 42 of the film 4 around a pair of guide pins 140 and 141 (FIG. 17) which are properly positioned so that they correspond to the above described snubber 9 and the related cartridge 1 pressure pad 10 (FIG. 27) for facilitating the later positioning of the cartridge body around the wound film spool 6. The leading end 42 of the film is now placed in the guide jaws 142, 143 at the staking tool 144 (FIG. 19) with the tongue 41 on the film positioned with its adjacent shoulder portions 145 (FIG. 21) against guide pins 146 in the upper jaw member 143. The jaw member 143 is preferably pivotally mounted to be opened to permit removal of the film strip after the staking operation as illustrated in FIG. 20 and also preferably includes a toggle spring 147 (FIGS. 19 and 20) to cause the upper jaw member 143 to snap between its closed and open positions and to remain in the position to which it has been moved by the operator.

As best seen in FIGS. 19–23, the staking tool 144 includes a staking finger 150 and may include a guide rod 151. The finger 150 is positioning to move into the film attaching groove 152 in the plastic take-up spool 12 and the opposite edges 153 of the finger 150 engage spool walls above the film tongue 41 simultaneously pressing the film tongue 41 into the groove 152 and crimping the plastic around the film tongue 41 to lock it in place. The spring loaded staking tool is now opened and the upper gripping jaw 143 is also opened thereby releasing the take-up spool 12 and the attached film lead 42.

The pivotally mounted pressure arm 154 which engages the film roll 6 during the rolling operation is now swung clear as illustrated in FIG. 18 and the roll 6 together with a take-up spool 12 are now ready for insertion in the cartridge body portion 2. This is done by positioning the cartridge body portion 2 on the top of the wound spool 6 with the snubber 9 of the cartridge body portion 2 above the guide pins 140 and 141. The cartridge body 2 is now placed over the film roll 6 using corner guide block 156 while the arbor 130 and the guide pins 140 and 141 are simultaneously drawn downwardly away from the film through the intermediation of the loading lever 155 (FIG. 14). As seen in FIG. 14, the lever 155 is coupled to the slidably mounted arbor support shaft 138 and to guide pins 140 and 141 to draw them downwardly and away from the film roll 6 permitting the cartridge body 2 to be slipped in place with the film roll 6 and the adjacent portion of the film in place around snubber 9.

The cartridge body 2 is now slipped into a spaced guide frame 160 as illustrated in FIG. 18 and the threading of the film lead 42 is completed by placing it across the cartridge body 2 pressure pad 10 and threading it into the cartridge body 2 on the opposite side of the partition 5 from the roll 6 and by then partially winding the film lead 42 around the spool 12 as the spool 12 is fitted over the spool mounting shaft 161 within the cartridge body 2.

The cartridge body guide frame 160 is preferably attached to a cartridge cover feed platform 162 which is pivotally attached to the machine frame on hinge 163 as illustrated in FIGS. 15 and 16. The pivotally mounted platform 162 is moved by the operator to the inclined position as illustrated in FIG. 16 as well as in FIGS. 24 and 25 to facilitate the application of the cartridge cover 3 to the cartridge body 2. The platform is yieldably held in its upright position or in its inclined cover applying position by the action of a toggle spring 164 as seen in FIGS. 15 and 16. A beveled edge 165 (FIG. 16) is formed at the upper surface of the platform 162 to facilitate the passage of the lower side of the cartridge cover 3 between the loaded cartridge body 2 and the platform 162 as the cover is pressed into position over the cartridge body 2 within the guide frame 160 as illustrated in FIG. 24. The loading of the cartridge 1 is now completed and the cartridge 1 may be removed as illustrated in FIG. 25 for a final cover gluing and labelling operation which may be performed using plastic gluing and labelling apparatus.

It will be seen that an improved machine is provided for spooling, loading, and assembling film cartridges of the type particularly adapted for motion picture film cameras. The machine as described above is particularly suited to assembling compact cartridges of the type where the supply spool and the take-up spool are positioned in side-by-side relationship on opposite sides of a central partition. The machine automatically rolls the necessary supply spool in position for ready insertion into a magazine body and at the same time facilitates rapid and simple threading operations to fully thread the magazine and to insert the necessary take-up spool. The cartridge body thus loaded and threaded is conveniently presented for a final closing or sealing step with a cartridge cover.

The machine permits all of these steps to be performed by a relatively inexperienced operator at high speed with a maximum of automatic operation and a minimum of manual manipulations. Additionally the various elements of the machine are positioned and inter-related so that the machine steps are accurately performed to insure correct magazine loading and to insure fail-proof magazine operation within a motion picture or other camera.

The machine as described is also relatively simple in construction and has a design which permits continuous operation with a minimum of wear and in a manner which obviates a need for continuing adjustment.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. Apparatus for loading with film a picture film cartridge having a cartridge body with a dividing partition with a film roll positioning boss on one side of the partition and a coaxially positioned take-up spool mounting on the opposite side of the partition and film pressure pad at the partition comprising the combination of means to wind a roll of film of predetermined length from a film supply of indeterminate length, means positioned intermediate the wound roll and the supply for cutting the film and for shaping each of the cut ends, means for attaching the cut and shaped end of the film connected to the roll to a take-up spool, means for withdrawing the winding means from the wound film roll permitting the cartridge positioning boss to be inserted within the wound film roll, means for positioning the cartridge body over the wound film roll with the boss positioned within the roll and the take-up spool mounting and pressure pad exposed permitting the take-up spool to be mounted on the mounting with the film extending over the pressure pad, and means for thereafter repositioning the film loaded cartridge body for permitting a cover to be placed thereon.

2. An apparatus as claimed in claim 1 wherein the winding means is controlled by a film footage counter.

3. An apparatus as claimed in claim 1 wherein the film end attaching means includes a staking tool.

4. An apparatus for loading film in a cartridge having a body portion with a supply compartment and a take-up compartment supported by a dividing partition which has a loading boss on the supply side and a take-up spool mounting on the opposite side with a pressure pad on an intermediate edge adjacent an exposure aperture in a cover member comprising the combination of film supply means, film spooling means for winding a roll of film from said supply means onto an arbor, a film footage counter for controlling the operation of said spooling means, film cutting means between said supply means and said spooling means for cutting the film on the roll from the supply, means for attaching the cut end of the roll to a take-up spool, and loading means for transferring the film roll from the arbor to the cartridge loading boss while permitting the take-up spool to be placed on its mounting with the film extending over the pressure pad and a cover to be placed on the cartridge.

5. An apparatus as claimed in claim 4 wherein the film footage counter stops the spooling means when the roll reaches a predetermined length.

6. An apparatus as claimed in claim 4 wherein the cutting means includes dies which shape each of the cut ends.

7. An apparatus as claimed in claim 6 wherein the cutting means includes a film marking means which operates in synchronism with the dies.

8. An apparatus as claimed in claim 4 wherein the loading means includes a guide frame for holding the cartridge body and a cover feed platform which is pivotable into alignment with said frame for placing the cover on the cartridge body.

9. The machine as claimed in claim 7 in which said marking means comprises a web of tape of indeterminate length having a plurality of transferable legends thereon for transfer to the film.

10. The machine as claimed in claim 7 in which said marking means comprises a web of tape of indeterminate length having a plurality of heat sensitive legends thereon for transfer to the film.

11. The apparatus as claimed in claim 3 in which said staking tool comprises a staking finger shaped for engaging and deforming spaced portions of the take-up spool.

References Cited

UNITED STATES PATENTS

| | | |
|---|---|---|
| 3,364,551 | 1/1968 | Napor. |
| 3,364,552 | 1/1968 | Napor. |
| 2,984,425 | 5/1961 | Thayer _____ 53—118 X |
| 3,142,890 | 8/1964 | Adams. |
| 3,208,686 | 9/1965 | Edwards _____ 242—71.2 |
| 3,325,889 | 6/1967 | Meli _____ 29—430 |
| 3,382,779 | 5/1968 | Lynas _____ 93—94 |

WAYNE A. MORSE, Jr., Primary Examiner

U.S. Cl. X.R.

29—430; 53—21, 78, 118; 242—55.13, 71.2